Dec. 23, 1930.                H. NEUWIRTH                1,786,219
                                BAROMETER
                            Filed Feb. 4, 1930
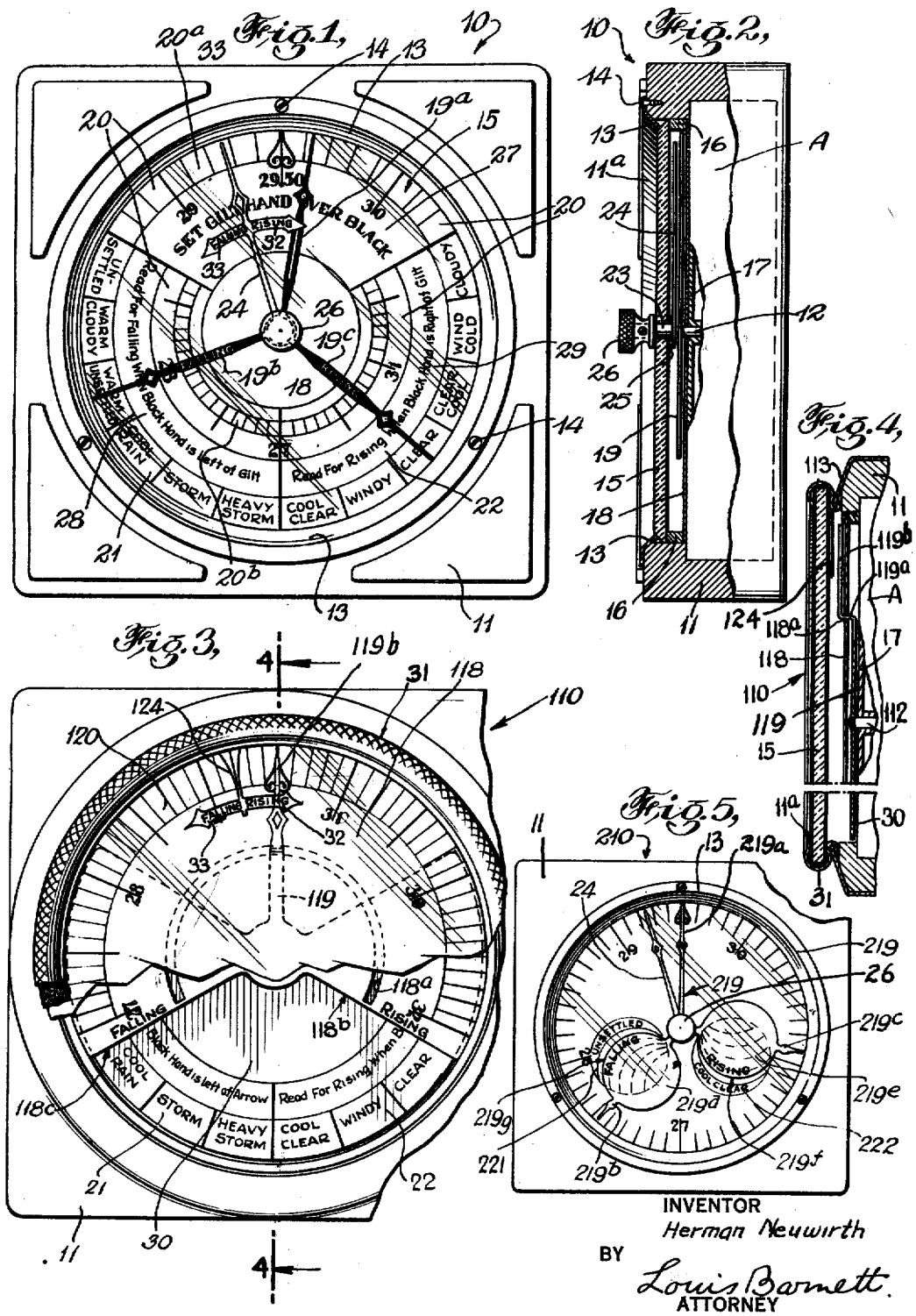
INVENTOR
Herman Neuwirth
BY
Louis Barnett
ATTORNEY Patented Dec. 23, 1930

1,786,219

UNITED STATES PATENT OFFICE

HERMAN NEUWIRTH, OF BROOKLYN, NEW YORK

BAROMETER

Application filed February 4, 1930. Serial No. 425,744.

This invention relates to barometers and more particularly is directed to improve dial-indicator constructions for aneroid barometers.

One object of the invention is to provide in aneroid type of barometers novel dial-indicator constructions comprising few and simple parts forming a neat appearing assembly, which shall be readily set for ascertaining coming changes of weather, which shall be cheap to manufacture, and practical and efficient to a high degree in use.

Other objects of this invention will in part be obvious and in part be hereinafter pointed out.

The invention accordingly consists in the features of construction, combinations of elements and arrangement of parts which will be exemplified in the constructions hereinafter described and of which the scope of application will be indicated in the following claims.

In the accompanying drawing, in which is shown various possible illustrative embodiments of this invention, Fig. 1 is a front elevational view of an aneroid type of barometer, having a dial-indicator embodying the invention.

Fig. 2 is a side elevational view of the barometer shown in Fig. 1, partly broken away to expose the improved indicator.

Figs. 3 and 5 are front elevational views of aneroid barometers, constructed with other forms of dial-indicators embodying the invention partly broken away, and Fig. 4 is a fragmentary side view, in section, of the barometer shown in Fig. 3, corresponding to a cut taken on line 4—4.

Referring to the drawing, 10 denotes a barometer constructed to embody the invention. The barometer 10 is seen to comprise a suitable outer casing 11 into which is fitted an aneroid type of atmospheric pressure actuated mechanism, indicated generally by the housing A. The detail construction of the mechanism within the housing A for turning the indicator shaft 12 may be of any well understood make and forms no part of this invention.

The casing 11 has a circular shaped front opening 11a, the rim of which carries a bezel 13 secured by suitable means, such as screws 14 for firmly retaining a circular glass closure window 15 in said opening 11a in abutment against spacing member 16.

The housed mechanism A is positioned in the casing 11 with the side 17 thereof, through which the indicator shaft 12 extends, facing the opening 11a, said shaft 12 being in axial alignment with respect to the window 15.

A plate dial 18 is fixedly mounted against the exterior housing side 17, wherethrough the shaft 12 freely passes. A triple-handed pointer 19 is attached to turn with the free end of said shaft and is adapted to pass over the front side of the dial 18, as shown in Figs. 1 and 2. The dial 18 carries a circular scale 20 concentrically arranged with respect to the shaft 12, said scale may be calibrated to read in inches of mercury. As here shown the scale 20 has a range from 27 to 32 inches which is suitable for use at or close to sea level. The dial 18 also has two groups of weather nomenclatures 21 and 22, that is, sets of successively positioned interpretative legends whereby the weather is ascertained on falling or rising of the atmospheric pressure.

As seen from Fig. 1, the scale 20 occupies substantially the whole upper third of the dial 20a and the inner portion 20b of the remaining lower two thirds, while the falling and rising barometer legends 21 and 22, respectively, extends along the left and right lower third of the dial, respectively, outwardly of the scale portion 20b.

The triple-handed pointer 19 has three uniformly spaced radially extending hands 19a, 19b and 19c. The hand 19a, hereinafter designated as the "black hand", is adapted to read the scale 20 for indicating the atmospheric pressure.

The hands 19b and 19c, are adapted to indicate a specific legend of the nomenclatures 21 and 22, respectively, on falling and rising of the atmospheric pressure, respectively, for ascertaining the coming changes in the weather conditions in the manner hereinafter described.

The window glass 15 has extending through the center thereof, the shaft 23 in alignment with the shaft 12. The shaft 23 has attached at its inner end, a reminder or setting pointer 24, hereinafter designated as "gilt hand," a washer 25 being provided to space the pointer 24 from the glass 15. The outer end of the shaft 23 has a knurled knob 26 for manually turning the shaft 23 with the pointer 24, as is readily understood from Fig. 2. The inner end of the shaft 23 terminates just short of the shaft 12 so that the turning of said pointer 24 is independent of and does not interefere with the pointer 19 or the operation of the mechanism A.

Directions for setting and reading the barometer may be impressed on the dial at 27, 28 and 29 as shown in Fig. 1.

The manner of using the improved barometer 10 is now apparent. After assembling a barometer with the parts described above and shown in Figs. 1 and 2, the approaching weather conditions are readily ascertained, by first setting the "gilt hand" 24 by turning the knob 26 to coincide with the "black hand" 19a. After a lapse of time, a change in the atmospheric pressure (generally preceding a change in the weather conditions) will be indicated by a divergence between the "gilt hand" and the "black hand." Thus as shown in Fig. 1, the "black hand" is positioned to the right of the "gilt hand" indicating a rise of atmospheric pressure. Now reading the legend indicated by hand 19c shows "clear", the atmospheric pressure being slightly over 29.6 inches as indicated by the "black hand" 19a. In a like manner on falling of the atmospheric pressure, as shown on the dial when the "black hand" is to the left of the "gilt hand", the approaching weather condition is ascertained at the legend indicated by the hand 19b reading on the scale 21.

If desired, directional symbols or indicia 32 and 33 comprising the words, "Rising" and "Falling", respectively, may be provided to extend from the opposite sides of the reminder or "gilt hand" 24, said symbols serve to facilitate the determining of rising or falling of the barometer pressure indication when read with respect to the "black hand" 19a, as is clear from Fig. 1 which indicates "Rising."

Another form of the improved dial-indicator construction embodying the invention is shown in the barometer 110, Figs. 3 and 4. The barometer 110 is seen to comprise the outer casing 11 into which is fitted the housed mechanism A in substantially the same manner described above and as shown in Figs. 1 and 2. Here the turning shaft 112 from mechanism A does not extend through the plate dial 118 but stops just short of the back side of said dial, the latter being spaced forwardly from the side 17 of the mechanism housing A, as shown in Fig. 4. Attached to turn with the free end of the shaft 112 there is a pointer 119 which has an off-set 119a in the mid-portion thereof for extending through the circular slot 118a formed in the dial plate 118. Said slot is concentrically arranged with respect to the axis of the shaft 112. The free end of the pointer 119 terminates in a hand 119b which is adapted to move over the scale 120 on the dial 118. Said scale is calibrated in inches of mercury. Also attached to the shaft 112, diametrically opposite to the pointer 119, there is a vane or sector plate 30.

Said dial and sector plates, each may be equivalent to substantially three-fourths of the area of the front casing opening 11a, and as seen from Fig. 4, the sector plate 30 is adapted to swing under the dial plate 118. Said sector plate carries two groups of weather nomenclatures 21 and 22, which comprise interpreted legends for ascertaining the weather on falling or rising of the atmospheric pressure, like those on the dial 18 of the barometer 10 described above.

In place of the setting pointer 24, shown in the barometer 10, there is provided, an indicating arrow 124, preferably attached permanently to the circular glass closure window 115. This arrow has extending from either side thereof, the directional symbols or indicia 32 and 33, respectively, comprising the words, Falling extending to the left and Rising extending to the right. The window 115 is secured to the bezel 113 through an annular ring 31, the glass together with the arrow 124, may be rotated for setting the latter to read on the scale 120 in the same manner described above for the pointer or "gilt hand" 24 of the barometer 10.

The operation of the barometer 110 will now be readily understood. The reminder arrow 124 is set by turning the ring 31 so that said arrow coincides with the hand 119b. Changes in atmospheric pressure will cause divergence between the arrow 124 and the hand 119b. The hand 119b will point to the indicia 32 or 33, and as shown in Fig. 3, the hand 119b indicates the Rising of atmospheric pressure by indicia 32. Now reading the legend indicated at the edge 118b on the nomenclatures 22 shows "Clear", the atmospheric pressure being approximately 29.5 inches as indicated by the hand 119b. In a like manner on falling of the atmospheric pressure shown on the dial when the hand 119b is to the left of the arrow 124, the hand 119b will indicate Falling on the indicia 33. The approaching weather condition in the latter case is ascertained at the legend indicated by the edge 118c of the dial plate 118.

Still another form of the improved dial-indicator construction embodying the invention is shown in Fig. 5. Barometer 210, here shown, may be similar to barometer 10 described above, with the exception of the arrangement of grouping of the weather nomenclatures 221 and 222 with respect to the multi-handed pointer 219. The latter besides having a "black hand" 219a, has hands 219b and 219c corresponding to the hands 19b and 19c of barometer 10. Said hands 219b and 219c being formed with enlarged portion 219d and 219e, respectively which serve as covering means extending over nomenclatures 221 and 222, respectively. Thus when the hand 219a and the pointer 24 show rising of atmospheric pressure, the approaching weather condition may be ascertained at the legend of nomenclature 222 indicated by the edge 219f of the enlarged portion 219e. Similarly on falling of the atmospheric pressure, the approaching weather changes are indicated at the edge 219g of the portion 219d by the legend of nomenclature 221.

It will thus be seen that there is provided devices in which the several objects of this invention are achieved and which are well adapted to meet the conditions of practical use.

As various possible embodiments might be made of the above invention, and as various changes might be made therein the embodiments above set forth or shown in the accompanying drawing are to be interpreted as illustrative and not in a limiting sense.

Having thus described my invention, I claim as new and desire to secure by Letters Patent:

1. In an aneroid barometer, a dial having a calibrated scale and a plurality of sets of interpretive legends, and a three-handed pointer actuated by the barometer mechanism and having one hand for indicating the atmospheric pressure on the scale and hands co-operating respectively with each set of legends, as and for the purpose described and specified.

2. In an aneroid barometer, a dial having a calibrated scale and a plurality of sets of interpretive legends, and a three-handed pointer actuated by the barometer mechanism and having one hand for indicating the atmospheric pressure on the scale and hands co-operating respectively with each set of legends, a manually operable setting means for selectively indicating a scale pressure reading, said means including directional indicia, as and for the purpose described and specified.

3. In an aneroid barometer, indicating means comprising a dial having a calibrated pressure scale and a plurality of sets of interpretive legends, a manually operable setting pointer mounted to co-operate with said scale, and a three-handed member actuated by the barometer mechanism having one hand for showing the atmospheric pressure on the scale and a hand for each of said sets of legends whereby a deviation between said pointer and first mentioned hand forecasts the coming changes in the weather conditions as indicated by another of said hands on one of said legends.

4. In an aneroid barometer, a dial having an atmospheric pressure scale, weather nomenclature relating to rising atmospheric pressure conditions, weather nomenclature relating to falling atmospheric pressure conditions, and a tri-hand pointer actuated by the barometer mechanism and comprising a hand for indicating a reading on said scale and hands for respectively indicating a reading on each of said nomenclatures.

5. In a weather ascertaining device, an atmospheric pressure gage having a dial, carrying a pressure scale, an indicator having a pointer movable with respect to the atmospheric pressure by the said gage, means carrying separate groups of weather legends, and means movable with said pointer and co-operating with each of said groups for indicating a change in the weather conditions.

6. An aneroid barometer comprising means for indicating the direction and extent of change of barometric pressure, means carrying two sets of indicia, one set corresponding to a rise and the other set corresponding to a fall in pressure, and an index for each set operated in correspondence with the movement of said indicator means to indicate weather forecasts in correspondence with such changes of pressure.

In testimony whereof I affix my signature.
HERMAN NEUWIRTH.